United States Patent

Monti

[15] 3,635,048
[45] Jan. 18, 1972

[54] UNIVERSAL GEAR COUPLING
[72] Inventor: Giancarlo Monti, Varese, Italy
[73] Assignee: Siai-Marchetti S.p.A., Varese, Italy
[22] Filed: Dec. 23, 1969
[21] Appl. No.: 887,796

[30] Foreign Application Priority Data
Dec. 24, 1968 Italy..................25560 A/68

[52] U.S. Cl. ..................................................64/9 R
[51] Int. Cl..........................................F16d 3/18
[58] Field of Search..........................184/6 TT, 104 R; 64/9

[56] References Cited

UNITED STATES PATENTS

| | | | |
|---|---|---|---|
| 1,942,101 | 1/1934 | Howarth | 184/104 R |
| 2,408,336 | 9/1946 | Orr | 184/6 |
| 3,365,913 | 1/1968 | Shields | 64/9 |
| 3,521,463 | 7/1970 | Heidrich | 64/9 |

Primary Examiner—Kenneth W. Sprague
Attorney—Kurt Kelman

[57] ABSTRACT

A universal gear coupling including a driving and driven shaft, a housing surrounding the gears and rotatable at least with one of the shafts, a casing surrounding the housing and conduit means for circulating a lubricating fluid through the housing, the gears and the casing.

3 Claims, 1 Drawing Figure

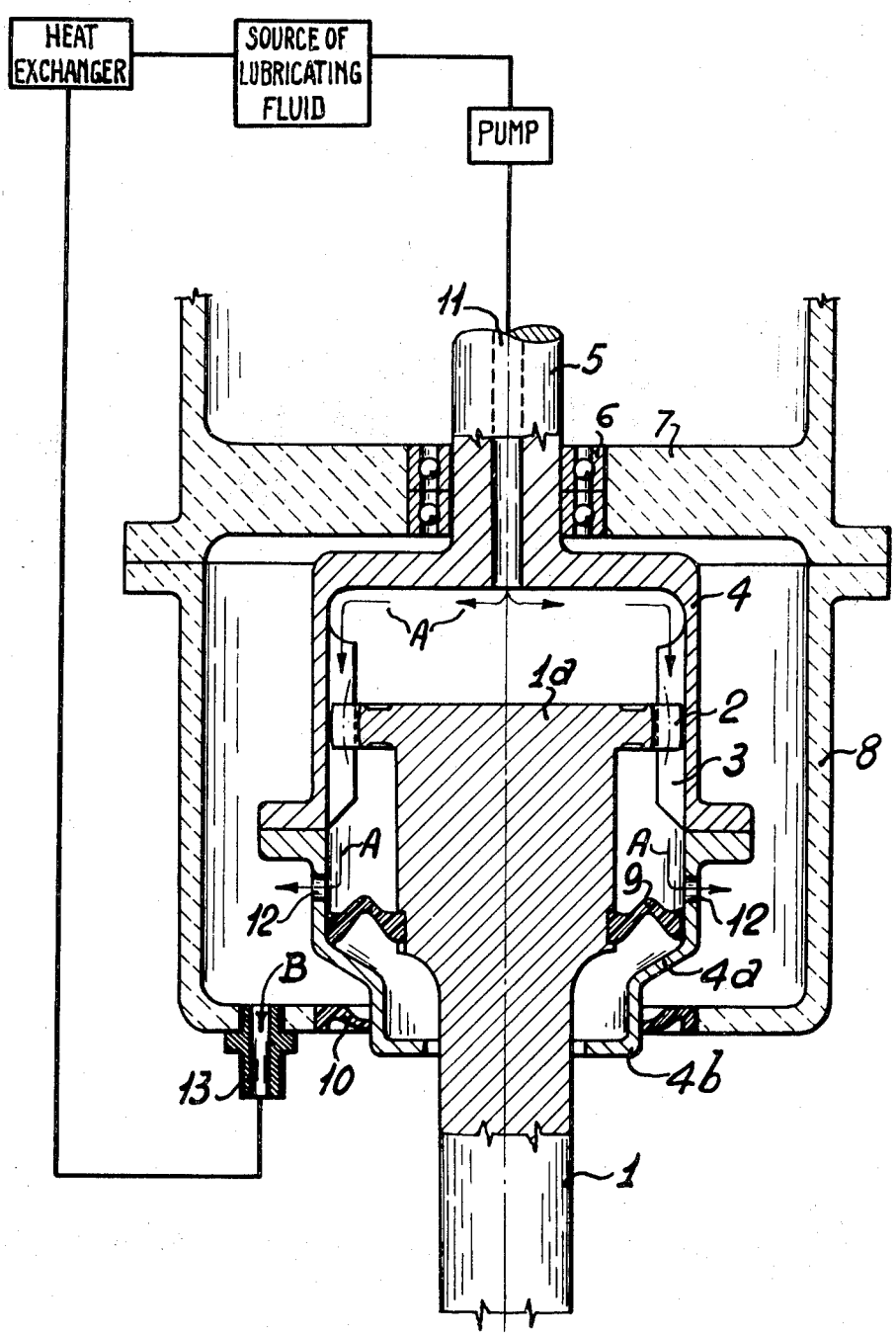

UNIVERSAL GEAR COUPLING

The present invention relates to a universal gear coupling, and in particular to a universal gear coupling provided with continuous lubrication means.

Universal gear couplings with spherically shaped meshing gears are well known. They are commonly utilized for the continuous transmission of high rotary torque from a motor shaft to a drive shaft in airplanes and similar high-speed vehicles. Such couplings permit the transmission of rotary motion between misaligned or offset shafts and permit variation in the distance between the centers of such shafts and their angular displacements.

Conventionally, such couplings have been grease lubricated and air cooled. The grease lubrication systems are wholly inefficient when the coupling is operated at very high r.p.m.'s since, under centrifugal action, the grease forms a crown within the couplings and is not uniformly distributed to the moving and meshing parts. Air-cooling systems require the use of large heat transfer fins and other means including, quite often, the use of centrifugal fans to dissipate the generated heat adequately.

It is an object of the present invention to provide a universal gear coupling which is simple in construction and which is continuously lubricated and cooled by simple and effective means.

It is another object of this invention to provide a universal gear coupling which is lubricated and cooled by the passage of oil under pressure through the coupling, it being contemplated that the oil may be recycled and reused.

It is a specific object of the invention to provide a universal gear coupling wherein the centrifugal forces generated by the rotation of the couplings are utilized in the circulation of the lubricating and cooling oil.

The above objects as well as numerous advantages of the present invention will be seen from the following description of a now preferred embodiment thereof.

According to the present invention, a universal coupling is provided comprising a driven shaft and a driving shaft having intermeshing gears. One of the shafts is provided with a gear housing, substantially sealed and surrounding the gears. A second housing or casing, also sealed, is formed about the first housing so that two chambers surround the gears. Lubrication fluid is fed through an inlet into the inner chamber, caused to flow about the gears, then passes to the second chamber to flow about the outside of the housing, and then passes out of the casing.

In the preferred form, the lubricating fluid is oil under pressure and is fed so as to spread out and move centrifugally within inner housing. Also, the oil may be recycled and passed through a cooling system so that cool lubricating fluid is supplied.

The following description makes reference to the accompanying drawing which is an axial longitudinal section of a universal coupling embodying the principles of the present invention.

With reference to the attached drawing it will be appreciated that the coupling is generally symmetrical about a central longitudinal axis X. Specifically, the coupling comprises a transmission or driving shaft 1 suitably connected to the output of a motor or the crankshaft of an engine, neither of which are shown. The transmission shaft 1 is provided with a radially extending boss 1a at its inner end about the periphery of which is formed a spherical gear 2. The gear 2 meshes with a correspondingly formed gear ring 3 integral with the cylindrical wall portion of a substantially enclosed housing 4. The housing 4 is formed at the end of a driven shaft 5 which is supported by a suitable roller bearing 6 secured within a stationary or fixed casing 7. The coupling housing 4 is provided with a necked cap portion 4a which is bolted or otherwise suitably fastened thereto. The cap 4a is provided with an annular top 4b through which the shaft extends. Secured across the space between the shaft 1 and the inner surface of the cover member 4a is a resilient annular packing 9 which seals the interior of the housing while allowing freedom of movement of the shaft.

A casing 8 is secured to the casing 7 so as to completely enclose the housing and cap 4a. The top 4b of the housing cap extends through an aperture 8a of the casing 8. The aperture is provided with a packing 10 which is secured to the inner periphery of the aperture 8a but maintains a sliding fit with the neck 4a of the housing. The sliding fit permits freedom of movement of the housing 4 while sealing the aperture 8a against leakage of fluid from within the casing. It will thus be seen that two, substantially sealed chambers are formed about each other, one within the housing 4 and the other within the casing 8.

The driven shaft 5 is provided with an axial inlet channel 11 extending into the member 4. The channel 11 communicates with a source of lubricating fluid (preferably oil) under pressure, provided with a pump to supply oil to the interior of the member 4 at one side of the meshing gears 2 and 3. The housing member 4 is provided with a plurality of ports 12 extending radially to the cylindrical wall. The ports 12 are located between the meshing gears 2 and 3 and the packing 9, permitting passage of oil between the interior chamber of the housing 4 and the interior chamber of the casing 8.

The casing 8 is itself provided with an axially extending outlet 13 providing an outlet from the casing chamber. The outlet 13 is preferably provided with conduit means communicating with a heat exchanger or other radiator means which will cool the oil and is provided with means for then returning the oil to the source. Consequently, oil supplied under pressure through channel 11 will flow from the interior of the housing 4 outwardly into the chamber of the casing 8 through the outlet 13 to the heat exchanger where it can be cooled and then recycled through the source.

In operation, the coupling is rotated in conventional manner so that the driving shaft 1 is caused to rotate the driven shaft 5. This rotation and the flexing and movement of the various parts relative to each other creates a considerable amount of heat. Oil under pressure, preferably cooled, is fed through the channel 11 into the interior of the member 4. Upon entry into the member 4, the rotation of the parts creates a centrifugal action, forcing oil under pressure centrifugally against the cylindrical walls and through the gear teeth 2 and 3, as indicated by the arrow A. The oil is thereafter forced through the outlets 12 into the interior of the casing 18 where it acts to cool the exterior surfaces of the housing 4. From the interior of the casing 8 the oil is fed through the nipple 13 as indicated by the arrow B from where it may be recycled or fed first into the heat exchanger and then back into the source of pressurized oil.

It is preferred that the universal joint is initially completely filled with lubricating oil so that, in operation, the unit may be filled with oil under pressure. Continuous flow of oil is then maintained by feeding and withdrawing uniform amounts of oil to and from the coupling. Because the lubricating oil may be recycled through a heat exchanger where it may be cooled to a predetermined temperature, the coupling does not require any external air-cooling system and so is of simpler construction. Furthermore, the lubricating oil contacts all of the surfaces of the coupling and not only those which are in direct contact with each other. As a consequence, more effective and complete lubrication and cooling is obtained.

The packings 9 and 10 assure complete sealing of the device, avoid leakage of oil under pressure, but permit universal movement of the respective parts.

While the present invention has been shown in a preferred embodiment, it is quite clear that various modifications may be made. For example, the inlet channel for the oil may be provided in the driving shaft 1 rather than in the driven shaft 5 and the flow of lubricating oil may be reversed so that the incoming oil enters through the nipple 13 and exits through the channel 11. The form of the casing and form of the coupling members may otherwise be modified as is well known in this art and yet provide for the continuous flowing of the lubricating and cooling oil through the coupling, as taught by the present invention. Accordingly, it is to be appreciated that the present description is by way of illustration only and it is not to be taken as limiting of the present invention.

I claim:

1. In a universal gear coupling, the combination of a driving shaft and a driven shaft, a housing carried by one of said shafts and having the other shaft extending thereinto, intermeshing gears provided on said other shaft and on the inside of said housing, flexible seal means between the inside of the housing and said other shaft, the interior of said housing defining a pair of internal chambers at the opposite sides of said intermeshing gears, a stationary casing having one of said shafts rotatably journaled therein and surrounding said housing in spaced relation to form an external chamber between the housing and the casing, flexible seal means provided between the casing and the housing to seal said external chamber, means for delivering lubricating fluid under pressure through one of said shafts into one of said pair of internal chambers, said housing being provided with fluid passages communicating the other of the internal chambers with said external chamber in said casing so that fluid delivered into said one of said internal chambers may flow past said intermeshing gears into the other internal chamber and then through said passages into said external chamber in said casing, and means for discharging fluid from said external chamber.

2. The device as defined in claim 1 together with conduit means for recycling fluid discharged from said external chamber to said fluid-delivering means.

3. The device as defined in claim 2 together with fluid-cooling means provided in said conduit means.

* * * * *